United States Patent Office 3,098,549
Patented July 23, 1963

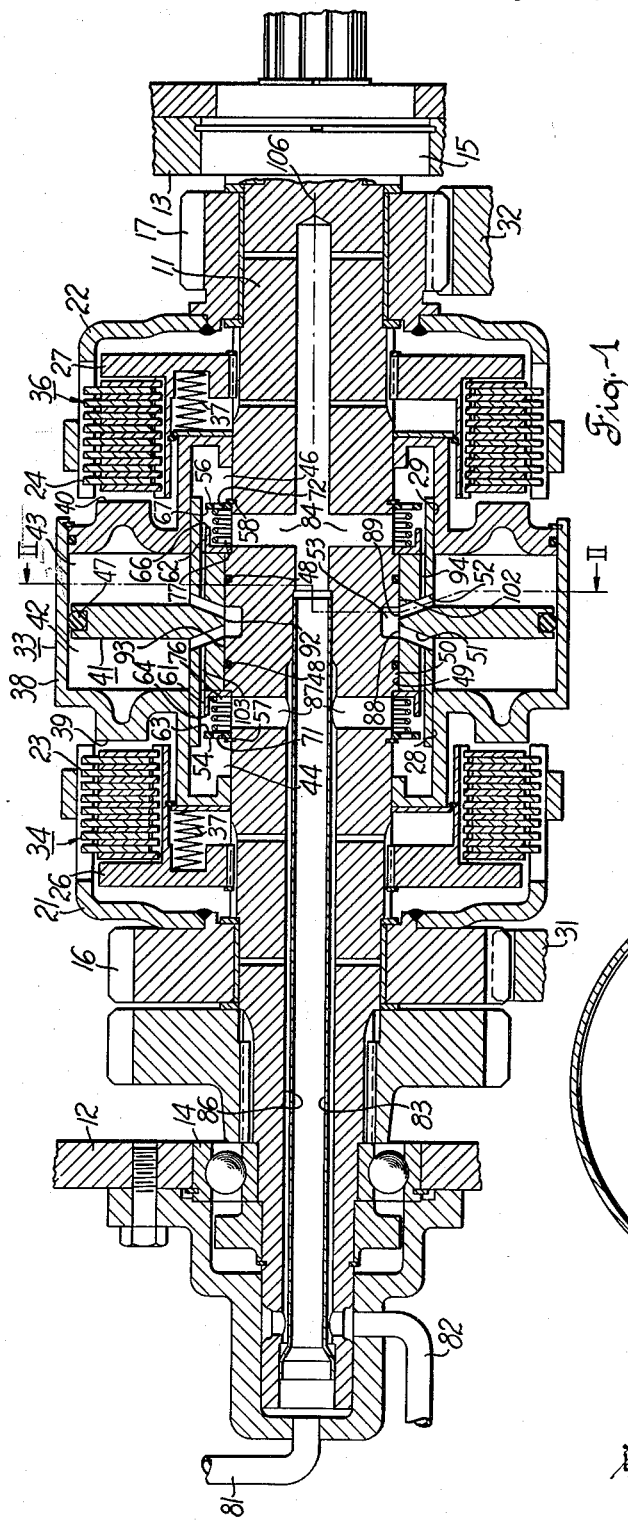

3,098,549
DOUBLE ACTING HYDRAULIC ACTUATOR
Frederick A. Schick, Springfield, Ill., and Charles L. Schwab, Wauwatosa, Wis., assignors to Allis-Chalmers Manufacturing Company, Milwaukee, Wis.
Filed Sept. 26, 1961, Ser. No. 140,758
11 Claims. (Cl. 192—87)

This invention relates to a hydraulically operated clutch mechanism and particularly to a hydraulically operated actuator for selectively engaging a pair of axially spaced clutch packs to alternately connect axially spaced gears to the shaft on which the gears are mounted.

Heretofore, hydraulic actuators for a pair of axially spaced clutch packs have been suggested wherein fluid transfer takes place between fluid chambers at opposite ends of the double acting actuator. The present invention pertains to an improved fluid transfer type actuator for friction clutches. The reaction means for the heretofore suggested fluid transfer type actuator includes a central portion which is axially stationary in relation to the shaft and a pair of axially movable chamber dividers which are movable under the influence of pressure fluid admitted to one or the other side of the actuator to thereby effect closing of the fluid transfer passageway.

It is an object of this invention to provide a double actuator wherein the reaction member within the double acting cylindrical piston not only serves to separate the interior of the actuator into a pair of radially outer chambers and a pair of radially inner chambers but also is slidably mounted on the shaft carrying the actuator for limited movement and such movement serves to interrupt the fluid transfer between one of the pairs of chambers.

It is the further object of this invention to provide a double acting hydraulic actuator for a pair of axially spaced clutch packs mounted between a shaft and a pair of gears rotatably mounted on the shaft, wherein the reaction member serves as a valve member to control fluid transfer between axially spaced chambers of the actuator.

It is a further object of this invention to provide a hydraulic actuator wherein the shaft on which the actuator is mounted and the reaction member within the cylindrical piston of the actuator are constructed and arranged so as to operate as a valve for controlling the fluid transfer between a pair of chambers at opposite sides of the reaction member.

It is a further object of this invention to provide a hydraulic actuator for a pair of axially spaced clutch packs wherein limited axially movement of the reaction member of the hydraulic actuator serves to function as a valve member to control flow of fluid between the corresponding chambers at opposite sides of the reaction member.

These and other objects of this invention will be apparent to those familiar with the art to which this invention pertains, when the following description is read in conjunction with the drawings in which:

FIG. 1 is a section view of a portion of a transmission incorporating a hydraulic actuator of this invention; and FIG. 2 is a section taken along the line II—II of FIG. 1.

Referring to FIGS. 1 and 2, a shaft 11 is rotatably mounted in a pair of axially spaced walls 12, 13 of a transmission housing by antifriction bearings 14, 15. A pair of axially spaced transmission gears 16, 17 are rotatably mounted on the shaft 11. Outer clutch drums 21, 22 of clutches 34, 36 are welded to the gears 16, 17 respectively. A pair of clutch packs 23, 24 are operatively interposed between outer drums 21, 22 and inner drums 26, 27 which are splined to shaft 11. Gears 16, 17 mesh with other gears 31, 32 of the transmission.

The double acting hydraulic actuator 33 of this invention is interposed between the clutch packs 23, 24 and the shaft 11 to selectively effect engagement of clutch 34, of which clutch pack 23 is a part, or clutch 36, of which clutch pack 24 is a part. Two sets of circumferentially spaced springs 37 serve to maintain the cylindrical piston 38 of the actuator 33 in the neutral position in which it is illustrated and in this position neither clutch pack is engaged. The opposite axial ends 39, 40 of the cylindrical piston 38 are in confronting relation to the clutch packs 23, 24, respectively. A novel reaction member 41 is disposed within the cylindrical piston 38 and has concentric cylindrical walls 28, 29 which slidably engage cylindrical walls of the piston 38 thereby dividing the hydraulic actuator into a pair of radially outer chambers 42, 43 and a pair of radially inner chambers 44, 46. The reaction member 41 carries an O-ring seal 47 of conventional construction to effect sealing between the periphery of the reaction member 41 and the cylindrical piston 38. An inner cylindrical wall 49 defines a bore having a sliding fluid sealing fit on an enlarged portion 50 of shaft 11. A pair of O-ring seals 48 carried in annular grooves in the shaft 11 seal the reaction member 41 relative to the shaft 11.

Fluid passage means are provided between the outer chambers 42, 43 to permit fluid transfer therebetween during shifting of the cylindrical piston between positions of engagement with the clutch packs. The fluid passage means include passageways 51, 52 in the reaction member and a cavity in the form of an annular recess 53 in the shaft. Means are provided for mounting the reaction member 41 on the shaft for limited axial movement in opposite directions from the position in which it is illustrated, wherein fluid transfer freely occurs between chambers 42 and 43 through passageways 51, 52 and recess 53, to positions wherein fluid is prevented from flowing between the chambers 42 and 43 through the fluid passage means 51, 53, 52. The means for mounting the reaction member 41 for limited axial movement includes a pair of abutments in the form of washers 54, 56 on shaft 11 which are prevented from moving axially away from the reaction member 41 by snap rings 57, 58. The means for mounting the reaction member 41 for limited axial movement also includes a pair of abutments 61, 62 which are individually carried axially by the reaction member when the reaction member moves to the left or right from its neutral position. Movement of the reaction member 41 to the left is limited by the engagement of abutment surfaces 63, 64 of abutments 54, 61 and movement of the reaction member 41 to the right is limited by engagement of abutment surfaces 66, 67 on abutments 62, 56. Holes 71, 72 are provided in washers 54, 56 to permit fluid to flow to the inner chambers 44, 46 even when the abutment surfaces are in engagement. Biasing means in the form of coil springs 76, 77 serve to resiliently bias reaction member 41 toward its fluid transfer position in which illustrated.

A pair of fluid conduits 81, 82 are interposed between a source of fluid, not shown, and the double acting hydraulic actuator 33. Conduit 81 feeds fluid through passage 83 to feeder passages 84 which are in constant fluid communication with inner chamber 46. Conduit 82 connects with passage 86 having feed passages 87 which are in constant fluid communication with inner chamber 44. When both conduits 81, 82 are subjected to the same fluid pressure, for instance 8 p.s.i., the actuator will remain in the position illustrated. In the position illustrated, the radially inner ends of the axially spaced passages 51, 52 terminate in axially spaced ports 88, 89 which register with recess 53.

Upon connecting conduit 81 to high pressure fluid and conduit 82 to low pressure fluid, the chamber 46 will be pressurized to a greater extent than chamber 44 and the axial thrust due to the pressure differential will move the cylindrical piston 38 to the right. As the cylindrical piston 38 moves to the right, fluid will transfer from chamber 42 to chamber 43 through passageways 51, 52 and recess 53. Upon piston 38 engaging the clutch pack 24 the pressure will quickly build up in chamber 46 to such an extent that the spring 76 will be compressed and the reaction member 41 moved axially to the left into engagement with abutment 54 and in such position a fluid control surface in the form of cylindrical surface 92 of the reaction member 41 is in sealing engagement with cylindrical surface 93 of shaft 11 thereby preventing fluid transfer between chambers 42 and 43 through recess 53 and passages 51, 52. When this occurs, the pressure in chamber 43 will increase to that of chamber 46 due to high pressure fluid being supplied thereto through bleed passages 94.

Upon connecting conduit 82 to a high pressure fluid source and conduit 81 to a low pressure fluid source, the piston 38 will move to the left, due to a predetermined pressure differential between chambers 44 and 46, to initially engage clutch pack 23 with its end 39. During this initial movement fluid transfer occurs freely between outer chambers 42, 43. Upon initial engagement of clutch 34 the fluid pressure differential between chambers 44 and 46 will increase rapidly to a second predetermined value and the effective axial thrust exerted against that portion of the reaction member 41 within chamber 44 will be sufficient to compress coil spring 77. Abutment 62 will thereby be carried to the right by reaction member 41 into contact with abutment 56. When the reaction member 41 is thus shifted to its extreme right position, cylindrical sealing surface 102 will be in fluid sealing engagement with fluid control surface 92 thus blocking passageway 52 and cutting off fluid transfer between chambers 42, 43. Bleed passages 103 permit chamber 42 to be fully pressurized upon cutoff of fluid transfer and thus the clutch 34 will be fully engaged by the combined axial thrust exerted against the piston 38 by the high pressure fluid in chambers 42, 44.

Thus it is seen that the novel reaction member 41 of this invention provided for a double acting hydraulic actuator 33 for a pair of friction clutches 34, 36, is mounted for limited axially movement against the biasing influence of springs 76, 77 and this limited movement is utilized to effect the control of fluid flowing between the radially outer chambers 42, 43 of the hydraulic actuator. By utilizing fluid transfer between the larger chambers of the actuator rapid changes of speed ranges is possible when the actuator is used to operate clutches of a change speed transmission.

The high pressure fluid utilized to operate the actuator 33 may be at 150 p.s.i. and the low pressure fluid may be maintained at 8 p.s.i. Thus the actuator will be maintained full of fluid at all times to insure instant response to pressurization of one of the chambers 44, 46.

The double acting hydraulic actuator of this invention is simple in construction, reliable in operation and less expensive to provide than other double acting actuators heretofore suggested. As illustrated in FIG. 1 the cylindrical piston 38 has its opposite ends in axially confronting relation to clutch packs 23, 24 and is mounted coaxially on the shaft 11 for axial movement relative thereto between positions of engagement with the clutch packs 23, 24. The reaction member 41 within the cylindrical piston 38 serves as a valve member and its inner bore 49 presents a sealing surface 92 between passageways 51, 52 which is slidably engageable with cylindrical surfaces 93, 102 of shaft 11. The annular recess 53 in shaft 11 and the passageways 51, 52 together with the cylindrical surfaces 92, 93 and 102, which are concentric with axis 106 of shaft 11, serve as a valve to control the fluid transfer between the large chambers 42, 43 of the actuator. The springs 76, 77 serve as biasing means to keep the reaction member centered on the enlarged portion 50 of shaft 11. The axially spaced pairs of abutment surfaces 63, 64, 66, 67 serve to limit axial movement of the reaction member 41 to a fraction of the movement of the cylindrical piston 38.

It should be understood that it is not intended to limit the invention to the embodiment illustrated, and that the invention may be embodied in such other forms and modifications as are embraced by the scope of the appended claims.

What is claimed is:

1. A double acting hydraulic actuator for selectively engaging a pair of clutch packs operatively interposed between a shaft member and gearing rotatably mounted on said shaft member, comprising: a cylindrical piston having opposite ends in axially confronting relation to said clutch packs, respectively, and mounted coaxially on said shaft member for axial movement relative thereto between positions of engagement with said clutch packs; a reaction member within said cylindrical piston dividing each end of the latter into radially inner and outer chambers; fluid passage means between one of the pairs of inner and outer chambers including a passageway in said reaction member; means for controlling fluid flow through said passageway including a pair of axially spaced fluid sealing surfaces on one of said reaction and shaft members and a fluid control surface on the other of said reaction and shaft members in complementary engageable relation to said sealing surfaces; and means mounting said reaction member on said shaft member for limited axial movement in opposite directions from a position in which said surfaces are not in engagement and fluid is permitted to transfer freely between said one pair of chambers through said passage means to axially spaced positions wherein said control surface is in sealing engagement with one of said sealing surfaces and fluid is prevented from flowing between said one pair of chambers through said passage means.

2. The structure set forth in claim 1 wherein said one pair of chambers are said outer chambers.

3. A double acting hydraulic actuator for selectively engaging a pair of clutch packs operatively interposed between a shaft member and gearing rotatably mounted on said shaft member, comprising: a cylindrical piston having opposite ends in axially confronting relation to said clutch packs, respectively, and mounted coaxially on said shaft member for axial movement relative thereto between positions of engagement with said clutch packs; a reaction member within said cylindrical piston dividing each end of the latter into radially inner and outer chambers thereby providing a pair of outer chambers and a pair of inner chambers; fluid passage means between one of the pairs of chambers including a recess in one of said members and a cylindrical fluid control surface on the other of said members in radially confronting relation to said recess; cylindrical sealing surfaces on said one member at opposite axial ends, respectively, of said recess engageable with said control surface; means mounting said reaction member on said shaft member for limited axial movement in opposite directions from a position in which said surfaces are not in engagement and fluid is permitted to transfer freely between said one pair of chambers through said recess to axially spaced positions wherein said control surface is in fluid sealing engagement with one of said sealing surfaces and fluid is prevented from flowing between said one pair of chambers through said recess; and fluid passages connected to said other pair of chambers, respectively, and adapted for connection to a source of fluid, said piston being moved to one of said positions of engagement upon one of said other pair of chambers being subjected to a fluid pressure greater than the fluid pressure in the other of said other pair of chambers by a predetermined value.

4. The structure set forth in claim 3 wherein said one pair of chambers are said outer chambers.

5. A double acting hydraulic actuator for selectively engaging a pair of clutch packs operatively interposed between a shaft member and gearing rotatably mounted on said shaft member, comprising: a cylindrical piston having opposite ends in axially confronting relation to said clutch packs, respectively, and mounted coaxially on said shaft member for axial movement relative thereto between positions of engagement with said clutch packs; a reaction member within said cylindrical piston dividing each end of the latter into radially inner and outer chambers thereby providing a pair of outer chambers and a pair of inner chambers; fluid passage means between one of said pairs of chambers including a passageway in one of said reaction and shaft members; relatively engageable sealing surfaces on said members; means mounting said reaction members on said shaft member for limited axial movement in opposite directions from an intermediate position in which said sealing surfaces are disengaged and fluid is permitted to transfer freely between said one pair of chambers through said passage means to axially spaced positions wherein a pair of said sealing surfaces are in fluid sealing engagement and fluid is prevented from flowing between said one pair of chambers through said passage means; springs interposed between said shaft member and opposite sides of said reaction member biasing the latter toward its intermediate position; and fluid passages connected to said other pair of chambers, respectively, and adapted for connection to a source of fluid, said piston being moved in one axial direction to one of said positions of engagement when the pressure differential between said other pair of chambers exceeds a first predetermined value and said reaction member being moved in the opposite axial direction to one of its axially spaced positions when the pressure differential between said other pair of chambers exceeds said first predetermined value by a second predetermined value.

6. A double acting hydraulic actuator for selectively engaging a pair of clutch packs operatively interposed between a shaft and gearing rotatably mounted on said shaft, comprising: a cylindrical piston having opposite ends in axially confronting relation to said clutch packs, respectively, and mounted coaxially on said shaft for axial movement relative thereto between positions of engagement with said clutch packs; a reaction member within said cylindrical piston dividing each end of the latter into radially inner and outer chambers thereby providing a pair of outer chambers and a pair of inner chambers; fluid passage means between one of said pairs of chambers including a passageway in said reaction member; means for controlling fluid flow through said passageway including a pair of axially spaced fluid sealing surfaces carried by said shaft and at least one fluid control surface formed on said reaction member in complementary engageable relation to said axially spaced sealing surfaces; and means mounting said reaction member on said shaft for limited axial movement in opposite directions from a neutral position, wherein neither of said sealing surfaces engage said fluid control surface and fluid is permitted to transfer freely between said one pair of chambers through said passageway, to axially spaced positions wherein one of said sealing surfaces engages said fluid control surface to prevent fluid flow between said one pair of chambers through said passageway.

7. The structure set forth in claim 6 wherein said one pair of chambers are said outer chambers.

8. A double acting hydraulic actuator for selectively engaging a pair of clutch packs operatively interposed between a shaft and gearing rotatably mounted on said shaft, comprising: a cylindrical piston having opposite ends in axially confronting relation to said clutch packs, respectively, and mounted coaxially on said shaft for axial movement relative thereto between positions of engagement with said clutch packs; a reaction member within said cylindrical piston dividing each end of the latter into radially inner and outer chambers thereby providing a pair of outer chambers and a pair of inner chambers; walls in said reaction member defining a cylindrical bore concentric with said cylindrical piston and in axial sliding engagement with said shaft; a cavity in said shaft in radially confronting relation to said bore; a pair of passageways in said reaction member in fluid communication with one of said pair of chambers, respectively, and terminating at axially spaced ports at said bore; and means mounting said reaction member on said shaft for limited axial movement in opposite directions from a neutral position in which said ports register with said cavity to axially spaced positions wherein one of said ports is blocked.

9. The structure set forth in claim 8 wherein said cavity is an annular recess.

10. The structure set forth in claim 9 wherein said one pair of chambers is said outer pair of chambers.

11. A double acting hydraulic actuator for selectively engaging a pair of clutch packs operatively interposed between a shaft and gearing rotatably mounted on said shaft, comprising: a cylindrical piston having opposite ends in axially confronting relation to said clutch packs, respectively, and mounted coaxially on said shaft for axial movement relative thereto between positions of engagement with said clutch packs; a reaction member within said cylindrical piston having a bore in fluid tight sliding engagement with a portion of said shaft, said reaction member dividing each end of said piston into radially inner and outer chambers thereby providing a pair of outer chambers and a pair of inner chambers; an annular recess in said portion of said shaft; a pair of passageways in said reaction member in fluid communication with one of said pair of chambers, respectively, and terminating at axially spaced ports in said bore; means biasing said reaction member toward an intermediate position in which said ports register with said recess; and abutment means on said shaft and reaction member, respectively, for limiting axial movement of said reaction member relative to said shaft to a fraction of the movement of said cylindrical piston thereon, one of said ports being blocked by said shaft portion upon engagement of said abutment means thereby preventing transfer of fluid between said one pair of chambers.

References Cited in the file of this patent

UNITED STATES PATENTS

| | | |
|---|---|---|
| 2,920,732 | Richards et al. | Jan. 12, 1960 |
| 2,979,176 | Voth | Apr. 11, 1961 |
| 3,032,157 | Richards | May 1, 1962 |